United States Patent [19]

Haensel et al.

[11] 4,008,182

[45] Feb. 15, 1977

[54] LOW DENSITY REFRACTORY INORGANIC OXIDE PARTICLES HAVING HIGH MICROPORE VOLUME

[75] Inventors: Vladimir Haensel, Hinsdale; John C. Hayes, Palatine, both of Ohio

[73] Assignee: UOP Inc., Des Plaines, Ill.

[22] Filed: Oct. 28, 1975

[21] Appl. No.: 626,516

Related U.S. Application Data

[63] Continuation-in-part of Ser. No. 429,435, Dec. 28, 1973, abandoned.

[52] U.S. Cl. .......................... 252/466 PT; 208/138
[51] Int. Cl.$^2$ ..................... B01J 21/04; B01J 23/62
[58] Field of Search ............... 252/463, 466 PT; 423/625

[56] References Cited

UNITED STATES PATENTS

| | | | |
|---|---|---|---|
| 2,838,375 | 6/1958 | Teter et al. ................... | 252/463 X |
| 3,578,584 | 5/1971 | Hayes ........................... | 252/466 PT |
| 3,632,503 | 1/1972 | Hayes ........................... | 208/138 X |
| 3,647,719 | 3/1972 | Hayes ........................... | 252/466 PT |
| 3,660,271 | 5/1972 | Keith et al. ................... | 208/138 X |
| 3,714,313 | 1/1973 | Beiding et al. ................ | 252/463 X |
| 3,740,328 | 6/1973 | Rausch ......................... | 252/466 PT |
| 3,759,841 | 9/1973 | Wilhelm ....................... | 208/138 X |
| 3,764,557 | 10/1973 | Kluksdahl .................... | 208/138 X |

Primary Examiner—W. J. Shine
Attorney, Agent, or Firm—James R. Hoatson, Jr.; Robert W. Welch; William H. Page, II

[57] ABSTRACT

Refractory inorganic oxide particles characterized by low bulk density in combination with high micropore volume are disclosed. The particles, especially the low bulk density - high micropore volume alumina particles, are useful as a support or carrier material to yield an improved reforming catalyst which is also disclosed.

2 Claims, No Drawings

LOW DENSITY REFRACTORY INORGANIC OXIDE PARTICLES HAVING HIGH MICROPORE VOLUME

CROSS-REFERENCE TO RELATED APPLICATION

This is a continuation-in-part of a copending application Ser. No. 429,435, filed Dec. 28, 1973, now abandoned.

It is an object of this invention to present novel porous refractory inorganic oxide particles featuring low bulk density in combination with high micropore volume. The porous particles, particularly the low density-high micropore volume alumina particles, when utilized as a catalyst support or carrier material impart improved activity to the catalytic composite. The porous, low density-high micropore volume alumina particles are especially useful as a support or carrier material for a platinum group metal, alone or in combination with a promoter metal, to yield an improved reforming catalyst — the reforming of gasoline boiling range feed stocks to improve the octane rating thereof being a process well known to the petroleum industry.

The porous refractory inorganic oxide particles embodied within the scope of this invention are characterized by an average bulk density of from about 0.25 to about 0.4 grams per cubic centimeter, with from about 0.6 to about 0.8 cubic centimeters per gram of the total pore volume being associated with pores having an average diameter of up to and preferably less than about 600 Angstroms.

Other objects and embodiments of this invention will become apparent in the following detailed specification.

The total pore volume of porous refractory inorganic oxide particles utilized as a catalyst support or carrier material is typically expressed in terms of pore size distribution, that is, in terms of the pore volume attributable to macropores and pore volume attributable to micropores. As herein contemplated, micropores are those pores having an average diameter of less than about 600 Angstroms as determined from the adsorption isotherm for nitrogen at liquid nitrogen temperatures and at a relative pressure $(P/P_0)$ of .97. The micropore volume will then consist of that portion of the total pore volume attributable to pores less than about 600 Angstroms in diameter, and the macropore volume will be the difference between the total pore volume and the micropore volume. The total surface area of the refractory inorganic oxide particles is a function of the micropore volume, substantially all of the surface area being associated with pores of less than about 600 Angstroms in diameter.

The porous refractory inorganic oxide particles of this invention, aside from the low bulk density-high micropore volume character thereof, are such as are commonly employed as a catalyst support or carrier material, for example, alumina, silica, zirconia, thoria, boria, titania, magnesia, chromia, and the like, and also composites thereof including alumina-silica, alumina-zirconia, alumina-chromia, and the like. Alumina is often a preferred refractory inorganic oxide for the use as a catalyst support or carrier material, and is an especially preferred support or carrier material with respect to reforming catalysts, and for the sake of clarity and brevity the further description of this invention is presented with particular reference thereto.

The alumina may be any of the various hydrated aluminum oxides or alumina gels including boehmite, gibbsite, bayerite, and the like. Activated aluminas, such as have been calcined or thermally treated at temperatures in excess of about 400° C. with the elimination of at least a portion of the water and/or hydroxyl groups commonly associated therewith, are particularly useful, especially gamma- and eta-alumina prepared by the thermal treatment of boehmite and bayerite respectively at temperatures generally in the range of from about 400° to about 850° C. The alumina can be prepared by the addition of an alkaline reagent, such as ammonium hydroxide, to an aqueous aluminum salt solution, for example an aqueous aluminum chloride solution, to precipitate a colloidal hydrous alumina or alumina gel. The gel can be dried as hereinafter directed and calcined at a temperature generally in excess of 400° C. The alumina may be subsequently prepared in tableted or granular form of graded mesh size adaptable for use in a fixed catalyst bed.

Refractory inorganic oxide particles of substantially spherical shape offer numerous advantages when employed as a support or carrier material for catalytically active metallic components. When disposed in a fixed bed in a reaction or contact zone, the spherical particles permit more uniform packing and reduce the tendency of the reactant stream to channel through the catalyst bed. When employed in a moving bed type of operation, that is, where the particles are transported from one zone to another by the reactants or an extraneous carrying medium, the spheroidal particles have a further advantage in that there are no sharp edges to break or wear off during processing thus creating a tendency to plug process equipment.

One preferred method of preparing the refractory inorganic oxide as spheroidal particles is in the gelation of a hydrosol precursor of said refractory inorganic oxide in accordance with the oil drop method. Said hydrosols are such as are prepared by the general method whereby an acid salt of an appropriate metal is hydrolyzed in aqueous solution and the solution treated at conditions to reduce the acid anion concentration thereof, as by neutralization. The resulting olation reaction yields inorganic polymers of colloidal dimension dispersed and suspended in the remaining liquid. For example, an alumina hydrosol can be prepared by the hydrolysis of an acid salt of aluminum, such as aluminum chloride, in aqueous solution, and treating said solution at conditions to reduce the resulting chloride anion concentration thereof, as by neutralization, to achieve an aluminum/chloride anion weight ratio from about 1:1 to about 1.5:1. Reduction in the acid anion concentration may be accomplished in any conventional or otherwise convenient manner. Thus, the acid anion concentration can be reduced by utilizing aluminum metal as a neutralizing agent. In this case, the salt of neutralization is an aluminum salt subject to hydrolysis and ultimate sol formation. In some cases, as in the case of aluminum acetate, where the acid anion is sufficiently volatile, the desired acid anion deficiency is created simply by heating. Another method of producing a suitable alumina hydrosol is in the electrolysis of an aluminum salt solution, for example an aqueous aluminum chloride solution, in an electrolytic cell having a porous partition between the anode and the cathode whereby an acid anion deficiency is effected in cathode compartment with the formation of an alumina hydrosol therein.

Preferably, the alumina hydrosol is an aluminum chloride hydrosol variously referred to as an aluminum oxychloride hydrosol, aluminum hydroxychloride hydrosol, and the like, such as is formed utilizing aluminum metal as a neutralizing agent in conjunction with an aqueous aluminum chloride solution. The aluminum chloride hydrosol is typically prepared by digesting aluminum in aqueous hydrochloric acid and/or aluminum chloride solution at about reflux temperature, usually from about 80° to about 105° C., and reducing the chloride anion concentration of the resulting aluminum chloride solution by the device of maintaining an excess of the aluminum reactant in the reaction mixture as a neutralizing agent. In any case, the aluminum chloride hydrosol is prepared to contain aluminum in from about a 1:1 to about 1.5:1 weight ratio with the chloride anion content thereof.

In accordance with the oil drop method, the hydrosol is dispersed as droplets in a hot oil bath whereby gelation occurs with the formation of spherical gel particles. In this type of operation, the hydrosol is set chemically utilizing ammonia as a neutralizing or setting agent. Usually, the ammonia is furnished by an ammonia precursor which is included in the hydrosol. The precursor is suitable hexamethylenetetramine, or urea, or mixtures thereof, although other weakly basic materials which are substantially stable at normal temperatures but hydrolyzable to form ammonia with increasing temperature, are suitably employed. Only a fraction of the ammonia precursor is hydrolyzed or decomposed in the relatively short period during which initial gelation occurs. During the subsequent aging process, the residual ammonia precursor retained in the spheroidal particles continues to hydrolyze and effect further polymerization of the alumina hydrogel whereby desirable pore characteristics are established. Aging of the hydrogel is suitably accomplished over a period of from about 10 to about 24 hours, preferably in the oil suspending medium, at a temperature of from about 60° to about 105° C. or more, and at a pressure to maintain the water content of the hydrogel spheres in a substantially liquid phase.

The foregoing oil drop method affords a convenient means of developing physical characteristics of the refractory inorganic oxide which are desirable in a support or carrier material for catalytically active metallic components. The method involves a number of process variables which affect both the density and the micropore volume of the spheroidal gel product. Generally, the metals/acid anion ratio of the sol will influence the crystallization process and the average bulk density of the spheroidal gel particles — higher ratios tending to give particles of lower average bulk density. Other process variables, including the time, temperature and pH at which the particles are aged, are effective to establish crystallite size and the micropore volume attendant therewith. Usually, temperatures in the higher range and longer aging periods result in lower average bulk densities.

In the usual course of drying and calcining the aged hydrogel particles, the drying step is invariably accompanied by large volume shrinkage of the particles and a corresponding increase in particle density. It has been observed that as the particle density increases there is a corresponding loss in total pore volume of the particles, and this is both logical and obvious. However, it has been further observed that as the particle density increases, the micropore volume of the particles tends to increase. It is postulated that substantially all of the micropore volume is established during the aging process — presumably by the formation and aggregation of crystallites. Thus, while the aggregates are drawn closer together during the drying operation with a resultant loss in total pore volume, the micropore volume associated with said aggregates tends to increase. In any case, when the aged hydrogel particles are dried at conditions to substantially obviate the aforesaid high volume shrinkage and resulting increase in density, the spheroidal gel product is characterized not only by its low average bulk density, but also by the high micropore volume more typical of the higher density products.

Drying conditions effective to substantially obviate the high volume shrinkage of the aged hydrogel particles particularly include a final water-wash prior to drying with the addition of a surfactant to the wash water whereby the drying process is effected in the presence of the surfactant. Preferably, the surfactant is a nonionic surfactant although other surfactants may be employed. Suitable nonionic surfactants include the various and well known polyoxyethylene alkylphenols, polyoxyethylene alcohols, polyoxyethylene esters of fatty acids, polyoxyethylene mercaptans, polyoxyethylene alkylamines, polyoxyethylene alkylamides, and the like. A polyoxyethylene alcohol with an average molecular weight of from about 200 to about 500 is particularly suitable. Preferably, the nonionic surfactant is utilized in the wash water in a concentration of from about 0.05 to about 1.0 wt. %.

Drying of the particles is suitably effected at a temperature of from about 38° to about 205° C., and the dried particles subsequently calcined, preferably in an oxidizing atmosphere such as air, at a temperature of from about 425° to about 760° C. The calcined particles are useful per se or impregnated with other catalytic components.

In particular, the particles are useful as a support or carrier material for a platinum group component alone or in combination with a tin component, a rhenium component and/or a germanium component to yield an improved reforming catalyst. The platinum group component is suitably composited with the support or carrier material by impregnation and/or ion-exchange techniques familiar in the art. For example, a soluble platinum group compound, that is, a soluble compound of platinum, palladium, rhodium, ruthenium, oxmium and/or iridium is prepared in aqueous solution, and the alumina, or other refractory inorganic oxide particles, soaked, dipped, or otherwise immersed therein. Suitable platinum group compounds include platinum chloride, chloroplatinic acid, ammonium chloroplatinate, dinitrodiamino platinum, palladium chloride, and the like. It is common practice to impregnate the support or carrier material with an aqueous chloroplatinic acid solution acidified with hydrochloric acid to facilitate an even distribution of platinum on the support or carrier material. The support or carrier material is preferably maintained in contact with the impregnating solution at ambient temperature conditions, suitably for at least about 30 minutes, and the impregnating solution thereafter evaporated to dryness. For example, a volume of the particulate support or carrier material is immersed in a substantially equal volume of impregnating solution in a jacketed rotary dryer and tumbled therein for a brief period at about room temperature. Steam is thereafter applied to the dryer jacket to expedite evaporation of the impregnating solution and recovery of substantially dry impregnated particles.

Thus, a further embodiment of this invention relates to porous particles of alumina characterized by an average bulk density of from about 0.25 to about 0.4 grams per cubic centimeter, with from about 0.6 to about 0.8 cubic centimeters per gram of the total pore volume being associated with pores having an average diameter of less than about 600 Angstroms, said particles being impregnated with from about 0.1 to about 2.0 wt. % platinum.

As heretofore stated, the porous particles of this invention are useful as a support or carrier material for a platinum group component alone or in combination with a tin component, a rhenium component, and/or a germanium component. The tin, rhenium and/or germanium components can be composited with the support or carrier material in any conventional or otherwise convenient manner. Suitable methods include impregnation and/or ion-exchange of the support or carrier material with a suitable compound of one or more of said components in any desired sequence, with or without intermediate calcination. In the impregnation of the support or carrier material, it is a preferred practice to impregnate one or more of said components on said support or carrier simultaneously with the platinum group component from a common impregnating solution. For example, when the added component is tin, stannic chloride is conveniently and advantageously prepared in common solution with chloroplatinic acid, the concentration of each component therein being sufficient to yield a catalyst product containing from about 0.01 to about 2.0 wt. % platinum and from about 0.1 to about 5.0 wt. % tin calculated as the elemental metals. Similarly, when the desired added component is rhenium, perrhenic acid and chloroplatinic acid can be prepared in a common aqueous solution to impregnate the support or carrier material, suitably with from about 0.01 to about 2.0 wt. % platinum and from about 0.01 to about 2.0 wt. % rhenium. Thus, another embodiment of this invention concerns porous alumina particles characterized by an average bulk density of from about 0.25 to about 0.4 grams per cubic centimeter, with from about 0.6 to about 0.3 cubic centimeters per gram of the total pore volume being associated with pores having an average pore diameter of less than about 600 Angstroms, said particles being impregnated with from about 0.01 to about 2.0 wt. % platinum and from about 0.01 to about 2.0 wt. % rhenium.

In still another embodiment of this invention, the added component is germanium, and the germanium component can be impregnated on the support or carrier material from a common aqueous solution of germanium tetrachloride and chloroplatinic acid to yield a catalyst product suitably containing from about 0.01 to about 2.0 wt. % platinum and from about 0.01 to about 2.0 wt. % germanium.

The tin, rhenium and/or germanium components, and particularly the tin and germanium components, are advantageously composited with the support or carrier material by coprecipitation or cogelation of said component with the alumina or other refractory inorganic oxide support or carrier material and, if so desired, subsequent impregnation and/or ion-exchange of the resulting composite with one or more of the remaining components herein set forth. For example, a soluble tin compound such as stannous or stannic chloride may be admixed with the described alumina hydrosol prior to dispersing the same as droplets in the hot oil bath. Following the aging process and subsequent calcination, an alumina support or carrier material is obtained comprising the tin component in intimate combination therewith and suitable for treatment by impregnation and/or ion-exchange techniques to incorporate, for example, the platinum group component. Porous alumina particles containing from about 0.1 to about 5.0 wt. % tin, and characterized by an average bulk density of from about 0.25 to about 0.4 grams per cubic centimeter with from about 0.6 to about 0.8 cubic centimeters per gram of the total pore volume being associated with pores having an average diameter of less than about 600 Angstroms, represent a preferred embodiment of this invention, said particles being impregnated with from about 0.01 to about 2.0 wt. % platinum.

The final catalyst composite generally will be dried at a temperature of from about 95° to about 315° C. over a period of from about 2 to 24 hours or more, and finally calcined at a temperature of from about 375° to about 595° C. in an air atmosphere for a period of from about 0.5 to about 10 hours in order to convert the catalytic components substantially to the oxide form. Although not essential, it is preferred that the resultant calcined catalytic composite be subjected to a substantially water-free reduction step prior to its use in the conversion of hydrocarbons. This step is designed to insure a uniform and finely divided dispersion of the catalytic components throughout the carrier material. Preferably, substantially dry hydrogen is used as the reducing agent in this step. The reducing agent is contacted with the calcined catalyst at a temperature of from about 425° to about 650° C. and for a period of from about 0.5 to about 10 hours. This reduction treatment may be performed in situ as part of a start-up sequence if precautions are taken to predry the plant to a substantially water-free state and if substantially water-free hydrogen is used.

The following examples are presented in illustration of one preferred embodiment of this invention and are not intended as an undue limitation on the generally broad scope of the invention as set out in the appended claims.

EXAMPLE I

An alumina hydrosol was prepared by digesting aluminum metal in dilute hydrochloric acid at a temperature of from about 102° C. to yield a hydrosol containing aluminum in about 1.15:1 weight ratio with the chloride anion content thereof. Thereafter, an amount of stannic chloride calculated to provide alumina particles containing 0.5 wt. % tin was dissolved in the hydrosol. The hydrosol was then cooled and admixed with a 28% aqueous hexamethylenetetramine solution to provide a hydrosol containing about 12 wt. % hexamethylenetetramine and 8 wt. % alumina, the mixture being maintained at 5°–7° C. The hydrosol was formed into spheroidal hydrogel particles by emitting the same as droplets into a gas oil suspending medium contained in a dropping tower at about 90° C. The spherical gel particles were aged in a portion of the gas oil for about 1½ hours at 150° C. and 300 psig pressure.

One portion of the aged spheres, hereinafter referred to as support A, was washed for about 1 hour in a flow of water. A second portion of the aged spheres, hereinafter referred to as support B, was washed substantially as described except that the wash water contained 1.0 wt. % surfactant (Antarox BL240). In each case, the spheres were dried for 1 hour at about 190° C., and calcined in air for 1 hour at 345° C., and then at 675° C. for 2 hours.

Ninety-four grams of each of the calcined supports, A and B, were impregnated with 275 milliliters of an aqueous chloroplatinic acid solution containing 1.636 milligrams of platinum per milliliter and 6 milliliters of concentrated hydrochloric acid. The supports were each soaked in the impregnating solution for about 1/2 hour and the solution thereafter evaporated to dryness utilizing a rotary steam evaporator. In each case, the dried spheres were calcined for 1 hour in air at 150° C., and then for 1 hour at 525° C., and subsequently reduced in a hydrogen atmosphere for 1 hour at 565° C. The resulting Catalyst A and Catalyst B are described below:

|  | Catalyst A | Catalyst B |
| --- | --- | --- |
| Average Bulk Density, gms/cc | 0.50 | 0.315 |
| Micropore Volume, cc/gm | 0.66 | 0.66 |
| Pt., wt. % | 0.53 | 0.53 |
| Sn, wt. % | 0.50 | 0.50 |
| Cl, wt. % | 1.19 | 1.31 |

EXAMPLE II

The catalysts were evaluated under substantially the same conditions utilizing a laboratory scale reforming apparatus comprising a reactor, a high pressure-high temperature hydrogen separator and a debutanizer column. A hydrogen-rich recycle gas was admixed with a naphtha charge stock to provide a hydrogen/hydrocarbon mole ratio of about 10:1. The hydrogen charge stock had an F-1 clear octane rating of 40. The mixture was preheated and charged downflow in contact with a fixed bed of the catalyst contained in the reactor. The mixture was charged in contact with the catalyst at a liquid hourly space velocity of 1.5 with a reactor outlet pressure being maintained at 100 psig. The reactor effluent was passed through the hydrogen separator wherein the hydrogen-rich gaseous phase was separated at about 13° C., a portion of which was recycled to the reactor through a high surface area sodium scrubber. The liquid phase from the hydrogen separator was passed to the debutanizer column with a $C_5+$ reformate product being recovered as bottoms from the column. The catalysts were in each case evaluated over six test periods, each test period comprising a 12-hour line-out period followed by a 24-hour test period, and the reactor inlet temperature was periodically adjusted to maintain the $C_5+$ reformate octane rating at 102 F-1 clear. The test results are tabulated below in terms of temperature required to make a 102 F-1 clear octane product.

| Test Period | Temperature, ° C. | |
| --- | --- | --- |
|  | Catalyst A | Catalyst B |
| 1 | 519 | 513 |
| 2 | 528 | 519 |
| 3 | 535 | 523 |
| 4 | 546 | 527 |
| 5 | 561 | 531 |
| 6 | — | 536 |

The above-described comparative catalyst evaluation serves to illustrate one of the advantages to be derived from the practice of this invention, that is, improved activity and activity stability with respect to the reforming of gasoline boiling range feed stocks.

We claim as our invention:

1. A cogelled composite of alumina and tin comprising 0.1 to 5 wt. % tin, and having deposited thereon from about 0.01 to about 2.0 wt. % platinum group metal, said composite characterized by an average bulk density of from about 0.25 to about 0.4 grams per cubic centimeter, with from about 0.6 to about 0.8 cubic centimeters per gram of the total pore volume being associated with pores having an average diameter of up to about 600 Angstroms.

2. The composite of claim 1 further characterized in that the platinum group metal is platinum.

* * * * *